United States Patent [19]

Ballantyne

[11] Patent Number: 4,653,970

[45] Date of Patent: Mar. 31, 1987

[54] QUARTER-TURN FASTENER

[75] Inventor: David B. Ballantyne, Bloomfield Hills, Mich.

[73] Assignee: Multifastener Corporation, Detroit, Mich.

[21] Appl. No.: 768,291

[22] Filed: Aug. 22, 1985

[51] Int. Cl.[4] ........................ F16B 21/00; B23P 11/00

[52] U.S. Cl. .................................... 411/555; 411/350; 411/179; 29/432; 29/520; 10/86 CL

[58] Field of Search .......................... 411/84, 179–181, 411/347, 349, 350, 552, 553, 555, 432; 10/86 CL; 29/432, 520

[56] References Cited

U.S. PATENT DOCUMENTS

| | | | |
|---|---|---|---|
| 2,580,666 | 1/1952 | Dzus | 411/555 |
| 3,117,610 | 1/1964 | Matthews | 411/84 |
| 3,594,876 | 7/1971 | Gunther | 411/555 |
| 3,845,860 | 11/1974 | Ladouceur et al. | 411/179 |
| 4,130,929 | 12/1978 | Dzus | 411/555 |
| 4,237,567 | 12/1980 | Grube | 411/179 |

*Primary Examiner*—Gary L. Smith
*Assistant Examiner*—Neill Wilson
*Attorney, Agent, or Firm*—Cullen, Sloman, Cantor, Grauer, Scott & Rutherford

[57] ABSTRACT

A quick action fastener suitable for fastening panels or the like in face-to-face contact, including a pierce nut adapted to be secured within one of the panels and a male stud inserted through the other panel and into a through-hole in the nut. The nut includes a central, pilot portion which is diepunched through the panel and a pair of undercut grooves on opposites sides of the pilot portion, into which edges of the panel are deformed in order to securely hold the nut on the panel. The nut includes a locking element extending across the through-hole which is received within and contacts with a spiral cam slot in the stud upon partial rotation of the stud to lock the stud in the nut and thereby securely fasten the panels together. In one embodiment, the stud is axially biased from the locking element by a spring captured between the head of the stud and one of the panels while another embodiment employs a pair of wire loops forming a spring support for the locking element. The nuts may be formed in a strip thereof and interconnected by frangible connections which are successively severed during automated die insertion of the nuts into a panel. In the strip form of the nuts, the locking element for each of the nuts is defined by a continuous frangible wire which extends along the strip and is severable at spaced between adjacent nuts during installation of the nuts into the panel.

5 Claims, 13 Drawing Figures

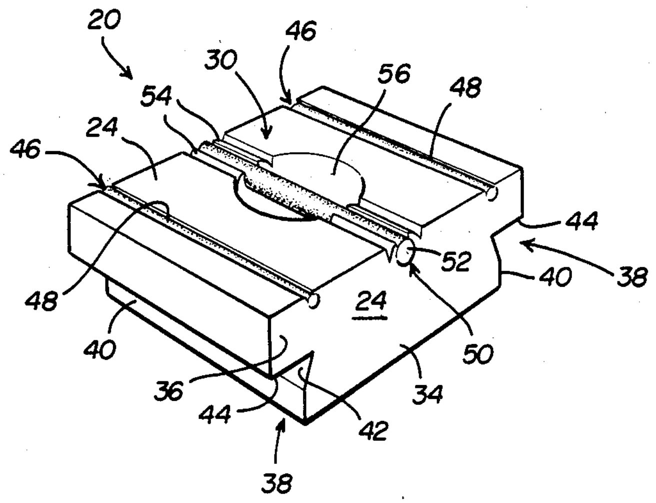
FIG. 2
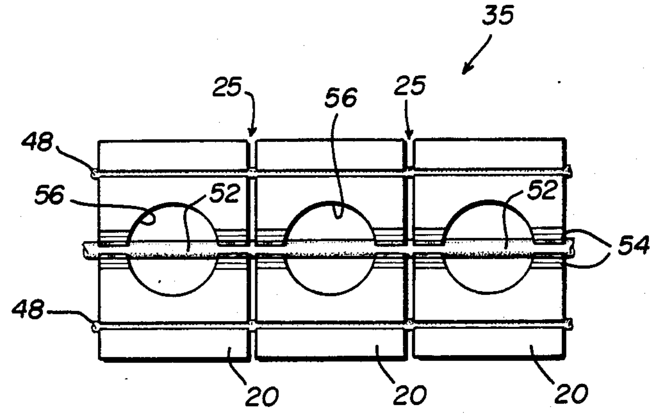
FIG. 3
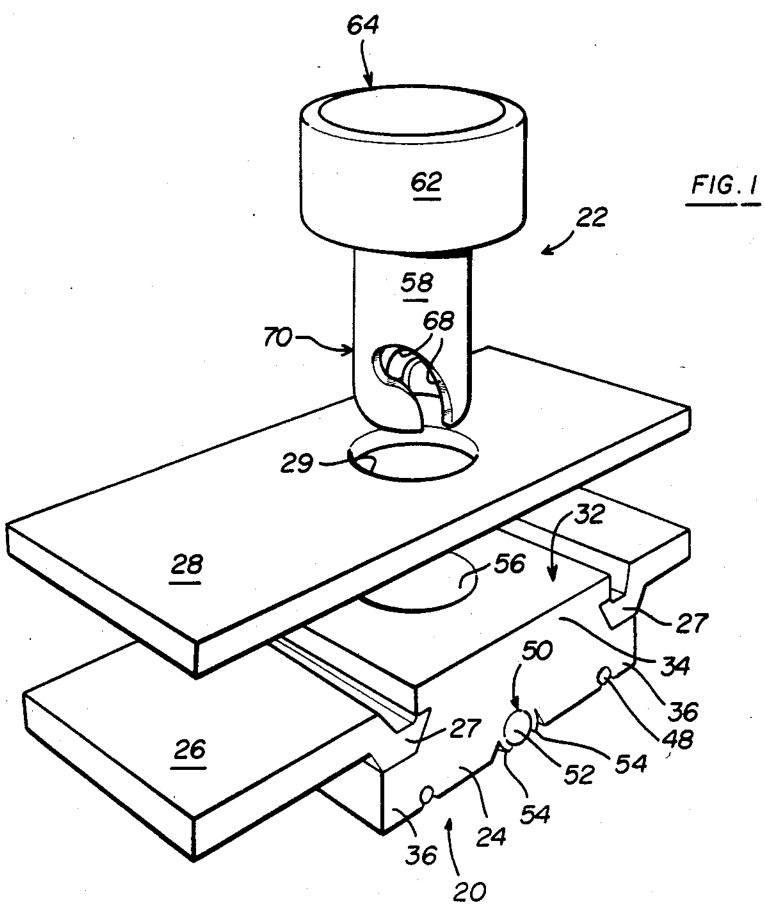
FIG. 1
FIG. 4
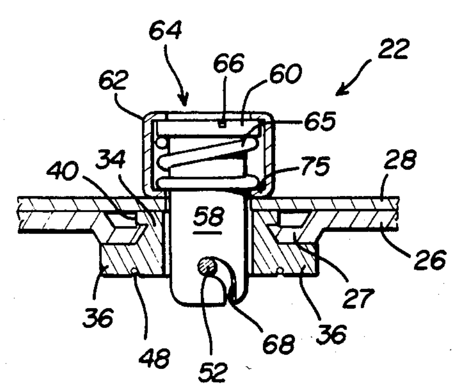

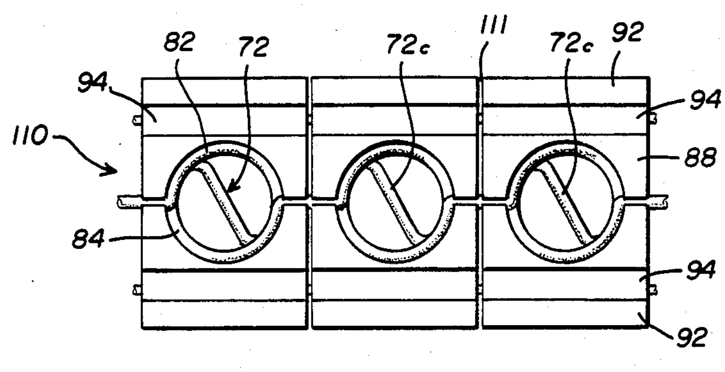
FIG. 10
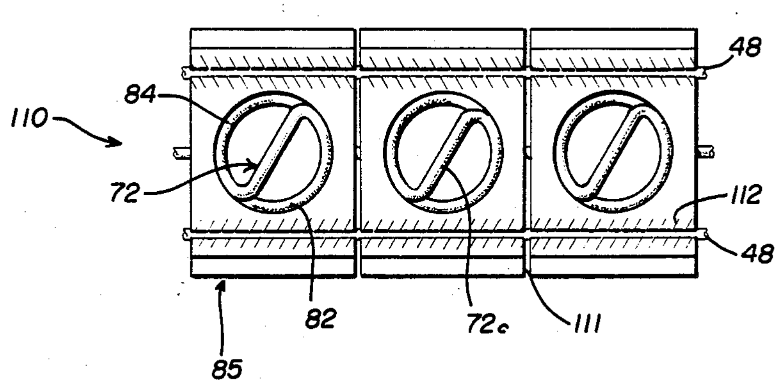
FIG. 11
FIG. 12
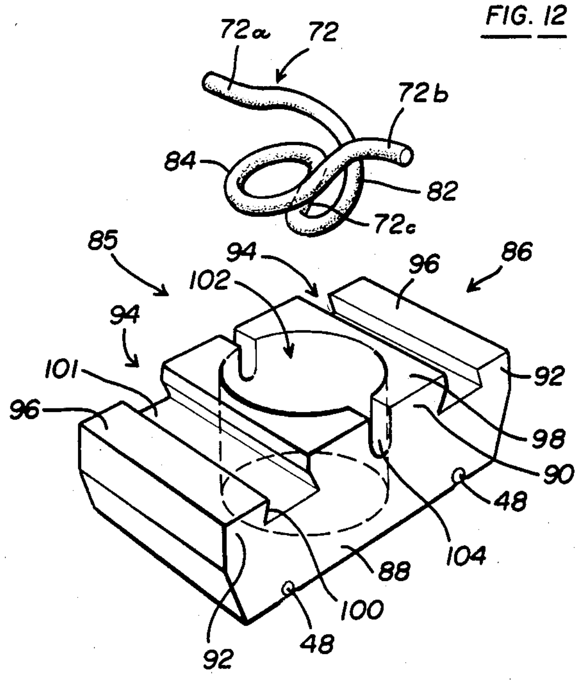
FIG. 13
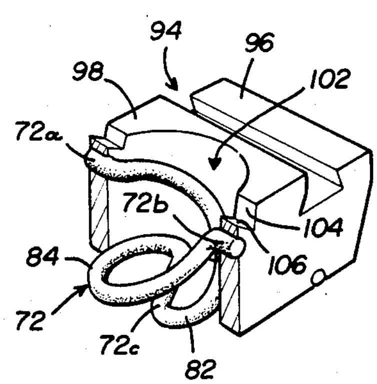

QUARTER-TURN FASTENER

TECHNICAL FIELD

The present invention broadly relates to fasteners, especially of the threadless type, which can be quickly locked in placed to secure together panels or the like. More particularly, the present invention relates to threadless fasteners suitable for securing together panels and the like in a high production environment.

BACKGROUND ART

Various types of self-piercing fasteners have been developed in the past in an attempt to obtain a strong union between the fastener and the part to which it is attached. For example, one successful prior art application of this type of fastener construction consists of a threaded nut and panel assembly which receives a fastener, such as a bolt, wherein the nut and panel are secured together by a die press in a single machine operation. The nut utilized in this type of assembly is commonly referred to in the art as a "pierce nut".

Pierce nuts of the type disclosed above and suitable for installation in a panel are disclosed in U.S. Pat. Nos. 3,439,723, issued Apr. 22, 1969 and 3,648,747, issued Mar. 14, 1972. As described in these prior patents, the threaded nut includes a central pilot portion having sharp edges which are used to pierce a sheet metal panel during a die punch operation in which the pilot portion of the nut punches through the panel to form an opening in the panel within which the nut is received. The nut includes undercut re-entrant grooves formed on opposite sides of the pilot portion which are filled with the edges of the panel by swagging or otherwise deforming the panel into such grooves. The re-entrant grooves, which are filled with panel metal, form a strong union between the nut and panel and serve to restrain the nut-panel assembly against separation.

The above described nut-panel assembly and method of nut installation is particularly efficient and suitable for a high production environment. In some cases, automated nut installation is facilitated by forming the nuts in a strip wherein the nuts are interconnected by frangible connections which are severed by automatic equipment as the nuts are successively removed from the strip and installed in a panel.

In many fastener applications, such as high volume, production line assembly, the speed with which the fastener and associated parts can be assembled in an important factor. Threaded type fasteners typically require more time and dexterity to assemble compared to other, "quick-action" nonthreaded fasteners. One type of known quick-action fastener employs a nutlike female portion which includes an aperture having a lock wire extending across the aperture, and a male portion having a spiral cam slot which receives and coacts with the lock wire to hold the male portion within the female portion. The nut like female portion is typically defined by a formed sheet metal body and in some cases may include a pair of outwardly extending flanges which engage the face of a panel surrounding an opening therein in order to hold the female portion on the panel. This type of construction is not well suited to a high production assembly environment since at least two operations are required for installing the nut like female portion: forming an opening in the panel and positioning and inserting the nut like female portion through the opening. Moreover, the resulting assembly is inferior in that the nut like female portion does not form an integral union with the panel, but rather some tolerance therebetween exists in order to allow passage of the female portion through the panel opening. Finally, these prior art fasteners are not suitable to be manufactured in strips to facilitate rapid installation thereof by automated equipment.

Accordingly, it is a primary object of the present invention to provide a quick action fastener suitable for high volume installation in panels and the like which overcomes each of the deficiencies of the prior art discussed above.

SUMMARY OF THE INVENTION

According to the present invention, a quick action fastener assembly is provided which is suitable for installation in a panel and the like in order to secure a second panel or similar part thereto. The fastener assembly includes a pierce nut securable within an opening in the panel formed by punching the nut through the panel. The nut includes a pilot portion for piercing the panel and a pair of flanges respectively on opposite sides of the pilot portion, each of the flanges including a groove configured to receive portions of the panel therein. The nut further includes a central threadless aperture therethrough and a locking element extending transversely across the aperture.

A male fastening member in the form of a stud is received within the nut aperture and includes a spiral cam slot for receiving and coacting with the locking element to lock the stud in the nut upon turning of the stud as little as ¼ turn. In one embodiment of the invention, the stud is axially biased away from the locking element by a spring which is captured between the head of the stud and the panel against which the stud head bears. In another embodiment, axial biasing of the stud is achieved by a pair of wire loops disposed within the nut aperture which form a spring support for the locking element. The nuts may be interconnected in a strip thereof by frangible connections which are successively severed during automated die installation of the nuts in a panel.

In the strip form of the nuts, the locking element for each nut is defined by a single, continuous frangible wire which extends along the strip and is severable between adjacent nuts during the nut installation. In one embodiment, the locking element is defined by a wire received within a groove in one face of the nut which forms a bearing surface that engages an opposing panel. In another embodiment, the locking element is defined by a wire received within a central groove in the opposite face of the nut.

BRIEF DESCRIPTION OF THE DRAWINGS

In the drawings, which form an integral part of the specification and are to be read in conjunction therewith, and in which like reference numerals are employed to designate identical features in the various views:

FIG. 1 is an exploded, perspective view of a pair of panels fastened together by a quick action fastener forming one embodiment of the present invention;

FIG. 2 is a perspective view of the nut which forms a portion of the fastener shown in FIG. 1;

FIG. 3 is a bottom plan view of a strip of the nuts of the type shown in FIG. 2;

FIG. 4 is a side elevational view of the nut-panel assembly shown in FIG. 1, parts being broken away in section for clarity;

FIG. 10 is a top plan view of a strip of interconnected nuts of the type shown in FIG. 8;

FIG. 11 is a bottom plan view of the nut strip shown in FIG. 10;

FIG. 12 is an exploded perspective view of the nut shown in FIG. 8; and

FIG. 13 is a perspective view similar to FIG. 12, half of the nut broken away in section to better reveal the position of the locking element within the nut.

DESCRIPTION OF THE INVENTION

Figure 5:
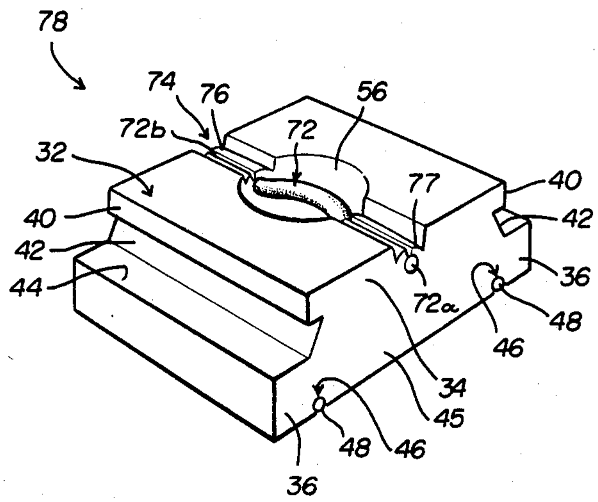
FIG. 5 is a perspective view of a nut similar to that shown in FIG. 2 but employing an alternate form of the locking element.

Referring first to FIGS. 1, 2, and 4, a nut-panel assembly according to one form of the present invention broadly includes a pair of flat panels 26, 28 and a quick action fastener for securing the panels 26, 28 in face-to-face contact with each other. It is to be understood that the panels 26, 28 are merely illustrative of parts suitable to be secured by the fastener and that other types and configurations of parts are contemplated for use with the fastener of the present invention.

The fastener includes a nut generally indicated at 20 which is secured to panel 26, and a male portion or stud generally indicated at 22 which extends through an opening 29 in the panel 28 and is received within the nut 20 in order to draw panel 28 into flush engagement with panel 26.

The nut 20 includes a substantially rectangular nut body 24 having flat, bottom and top faces 30, 32, respectively. The top face 32 defines a bearing surface which flushly engages the bottom surface of panel 28 when the fastener is locked in place, as best seen in FIG. 4.

The nut body 24 includes a central pilot portin 34 partially defined by sidewalls 40 which extend perpendicular to the top face 32 and provide a sharp cutting edge allowing the pilot portion 34 to pierce through the panel 26 during installation of the nut 20. A pair of elongate, parallel flanges 36 respectively on opposite sides of the pilot portion 34 are provided with parallel grooves 38 defined by an inwardly extending undercut 42 and a shoulder 44 which extends parallel to the face 32. The grooves 38 are thus configured to conjugally receive opposing edges 27 of the panel 26 which are deformed therein during installation of the nut 20 in the panel 26 in the general manner described, for example, in U.S. Pat. Nos. 3,314,138; 3,315,345 and 3,648,747, the entire disclosures of which are incorporated by reference herein.

The nut body 24 is provided with a cylindrical aperture or aperture 56 extending through the bottom and top faces 30, 32 respectively thereof. The aperture 56 includes a smooth, threadless sidewall, the longitudinal axis of the aperture 56 extending substantially perpendicular to the bottom and top faces 30, 32. The face 30 of the nut body 24 includes a central groove 50 therein which intersects and communicates with aperture 56. A locking element 52 defined by a straight metal wire is disposed within the groove 50 and extends transversely across the center of the aperture 56. The locking element 52 is secured within the groove 50 by material from the nut body 24 adjacent the groove 50 which has been deformed or otherwise swagged at 54 into overlapping relationship to the element 52. The nut body 24 further includes a pair of longitudinal grooves 46 defined in the face 30, respectively on opposite sides of the central groove 50.

As shown in FIG. 3, the nuts 20 may be manufactured and supplied for installation in the form of a strip 35 thereof in which the nuts 20 are aligned along a common axis, with their mutually adjacent sides parallel to and closely spaced at 25 from each other. However, the spacing 25 between adjacent nuts 20 is preferably sufficient to allow severing for purposes which will be discussed immediately below. The central groove 50 and outboard grooves 46 extend parallel to each other and are aligned with the corresponding grooves in adjacent nuts 20 in the strip. The locking element 52 employed in the nuts shown in FIG. 3 is defined by a single, continuous, straight wire mounted within the groove 50 of each of the nuts 20 and extending across the space 25 therebetween. Means for interconnecting the nuts in the strip thereof are provided by a pair of frangible connecting wires 48 secured within the grooves 46 as by swagging material from the nut body 24 into overlapping relationship to the wires 48. The connecting wires 48 in combination with the locking element 52 mechanically interconnect and maintain the nuts 20 in spaced apart aligned registration with each other to permit feeding the nut strip 35 to a suitable installation head (not shown) which successively severs these connections when the strip 35 is fed into the installation head.

As shown in FIGS. 1 and 4, the stud 22 includes a tubular, cylindrical shaft 58 having a head 60 on the outer end thereof. The head 60 may be provided with a slot 66 or other suitable feature to permit interengagement with a suitable tool, such as a driving blade, for rotating the stud 22. The outer end of the shaft 58 is enclosed by a generally cylindrical cap 62, the outer end of cap being open at 64 to allow tool access to the head 60. A spiral compression spring 65 is sleeved over the shaft 58 and is trapped between an annular shoulder 65 on the head 60 and an inwardly turned flange 75 of the cap 62 which bears against the outer face of panel 28. Thus, the spring 65 normally axially biases the shaft 58 when shaft 58 is compressed against it.

The inner end of the shaft 58 opposite the head 60 is provided with a pair of opposing, generally spiral cam slots 68 in the sidewall thereof. Cam slots 68 include a pair of transversely aligned openings in the bottom of the shaft 58 for receiving the locking element 52 therein. When the stud 22 is inserted into the aperture 56 with downward pressure, rotation of the head 60 results in camming of the locking element 52 against the surfaces of the cam slots 68; the locking element 52 acts as a cam follower forcing axial displacement of the stud 22 inwardly (downwardly as viewed in FIG. 4) through the aperture 56 against the biasing influence of spring 65. The cam slots 68 preferably extend approximately 90 degrees circumferentially around the shaft 56 so that approximately ¼ turn of the head 60 axially displaces the shaft 58 to a point where the locking element 52 reaches a locking position at the end 70 of cam slot 68. The end 70 of the cam slot 68 may be formed in an "over-center" position so as to securely lock the stud in its fastening position with the panels 26, 28 securely held in face-to-face relationship between the cap flange 75 and the nut body 24.

Figure 6:
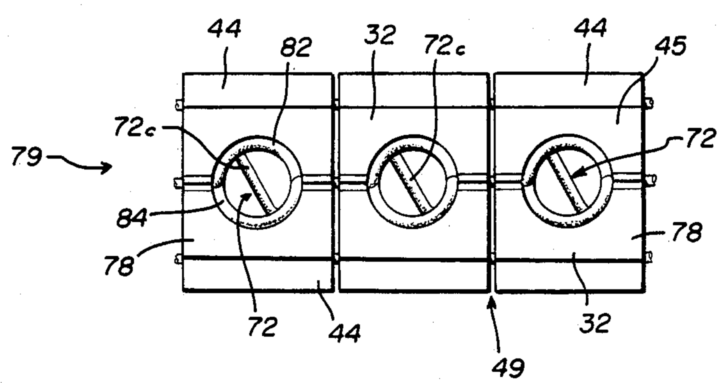
FIG. 6 is a view of a nut strip similar to FIG. 3 but depicting the alternate form the locking element shown in FIG. 5.
Figure 7:
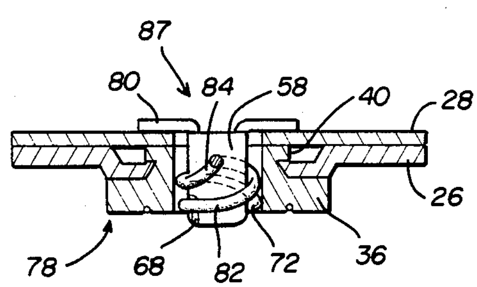
FIG. 7 is a side elevational view of a nut-panel assembly employing the alternate form of the locking element and an alternate form of the stud.
Figure 8:
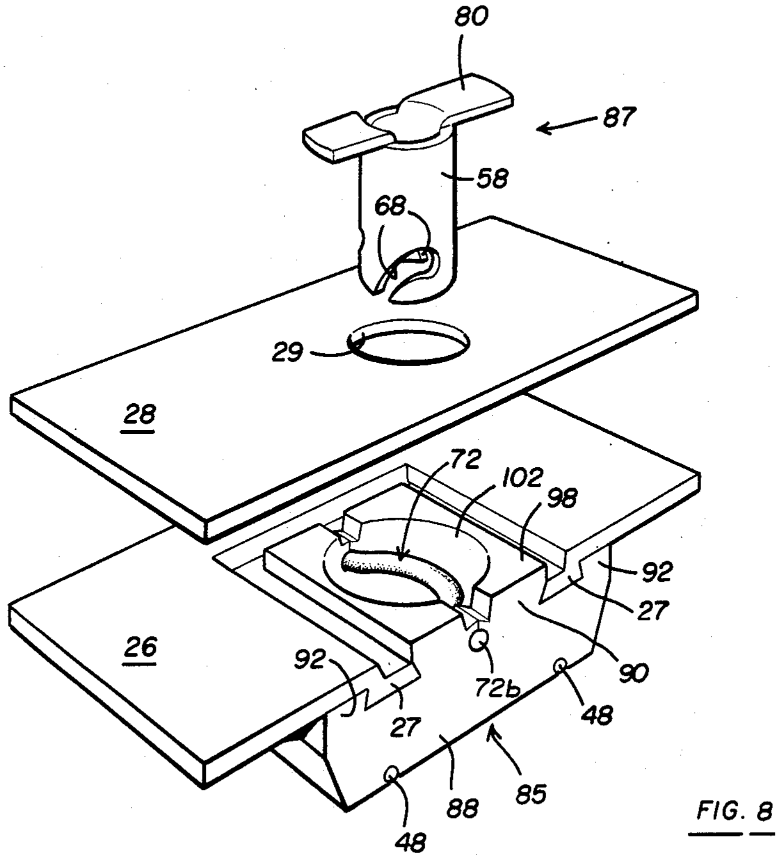
FIG. 8 is an exploded, perspective view of a pair of panels fastened together by an alternate form of the quick action fastener.
Figure 9:
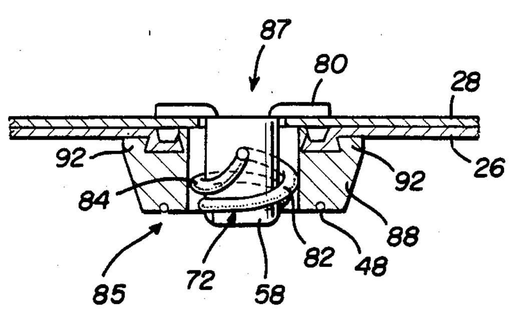
FIG. 9 is a side elevational view of the nut-panel assembly shown in FIG. 8, parts being broken away in section for clarity.

Attention is now directed to FIGS. 5–7 wherein an alternate form of the fastener of the present invention is depicted. The fastener includes a nut generally indicated at 78 and a male stud 87 received within the nut 78. The nut 78 includes a nut body 45 which is similar to the nut body 24 shown in FIGS. 1–4, except in certain respects which will now be described.

The upper face 32 defined on the pilot portion 34 is provided with a central groove 74 therein which intersects and communicates with the aperture 56. A locking element 72 in the form of a single metal wire having some degree of resiliency includes a pair of ends 72a, 72b which are secured within the groove 74, on opposite sides of the aperture 56, by means of nut body material which is swagged or otherwise deformed at 77 into overlapping relationship to ends 72a, 72b. The locking element 72 includes a straight leg 72c which is disposed within and extends transversely across the aperture 56 at an acute angle with respect to the axis of the groove 74. The opposite extremities of the leg 72c are respectively connected to the ends 72a, 72b by a pair loops 82, 84 respectively, which are disposed within the aperture 56 and are formed integral with the ends 72a, 72b and leg 72c. The loops 82, 84 effectively provide resilient spring mounting of the locking element leg 72c such that the leg 72c can be axially displaced (as viewed in FIG. 7) against the spring loading provided by the loops 82, 84.

As shown in FIG. 7, the stud 87 includes a tubular shaft 58 provided with spiral cam slots 68, similar to that previously described, however the stud 87 is provided with a pair of opposing, radially extending flanges 80 forming a stud head which engages the top face of the panel 28.

The nut 78 may be formed in a strip 79 thereof as shown in FIG. 6 in a manner similar to that previously discussed with respect to FIG. 3. The locking element 72 is defined by a single, continuous frangible wire extending along each nut body 45 in the strip thereof. The element ends 72a, 72b of the locking element 72 of adjacent nuts 78 are aligned and extend across the space 49 provided between the nut bodies 45 to allow severing of the locking element 72 along with the frangible connecting wires 48.

As best seen in FIG. 7, upon insertion of the stud 87 into the aperture 56, the stud shaft 58 is received within the loops 82, 84 and the leg 72c is received within the pair of cam slots 68. As the head 80 is rotated, the sides of the cam tracks 68 engage and axially displace the leg 72c upwardly toward the head 80 and against the biasing influence on leg 72c provided by the spring-like loops 82, 84. As in the case of the embodiment of the invention shown in FIGS. 1–4, the fastener shown in FIGS. 5–7 may be locked in place by rotating the stud 87 approximately ¼ turn in one direction, and may be quickly unlocked by a ¼ turn rotation in the opposite direction.

Reference in now made to FIGS. 8–13 wherein a further embodiment of the fastener of the present invention is depicted, which includes a male stud 87 identical to that previously described and a nut 85.

The nut 85 includes a generally rectangular nut body 88 having a pilot portion 90 and a pair of elongate flanges 92 on opposite sides of the pilot portion 90. Each of the flanges 92 is provided with a panel receiving groove 94 therein defined by a pair of undercuts or inwardly tapered sidewalls 100 and a bottom wall 101. The flanges 92 each include an upper face 96 for flushly engaging the bottom or rear side of a panel 26 to which the nut 85 is mounted, and the pilot portion 90 includes an upper face 98 which flushly engages the panel 28 which is secured in face-to-face contact with panel 26 by the stud 87. The nut body 88 is provided with a cylindrical, smooth walled aperture or through-hole 102 therethrough, extending perpendicular to the face 98 of the pilot portion 90. The pilot portion 90 is provided with a pair of aligned grooves 104 in its upper face 98, on opposite sides of the aperture 102. A locking element 72, identical to that previously described with reference to FIGS. 5–7, is disposed within the aperture 102, with the ends 72a, 72b thereof received within the grooves 104. Material at 106 from the nut body 88 adjacent the grooves 104 is swagged or otherwise deformed into overlapping relationship to the ends 72a, 72b of the locking element 72 in order to secure the locking element 72 to the nut body 88. As best seen in FIGS. 12 and 13, the locking element 72 includes a substantially straight leg 72c, the opposite ends of which are respectively formed integral with a pair of loops 82, 84 which provide resilient, spring-like mounting of the leg 72c.

As shown in FIGS. 10 and 11, the nuts 85 may be formed in a strip 110 thereof in a manner similar to that previously described with reference to FIG. 6. The locking elements 72 for each of the nut bodies 88 in the strip 110 thereof are formed from a single, continuous wire which extends between spaces 111 between the nuts 85. Frangible connecting wires 48 are received within grooves in one face of the nut bodies 88 and are secured in the grooves by swagging material as at 112 into overlapping relationship to the wires 48. The wires 48 as well as those portions of the locking element 72 extending across the spaces 110 are frangible and therefore may be successively severed during removal of individual nuts 85 from the strip 110 for installation into the panel 26.

From the foregoing, it is apparent that the fastener of the present invention not only provides for the reliable accomplishment of the object of the invention but does so in a particularly effective and economical manner. It is recognized, of course, that those skilled in the art may make various modification or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

I claim:

1. A panel fastener assembly, comprising:

first and second panels, said second panel including an opening therethrough; and a fastener for securing together said first and second panels in opposing, face-to-face contact with each other, said fastener including:

(1) a pierce nut secured to said first panel within an opening in said first panel formed by punching said nut through said first panel, said nut including first and second opposed faces, a pilot portion for piercing said first panel during punching of said nut through said panel, a pair of flanges on opposite sides of said pilot portion, first and second grooves respectively in said flanges, said grooves being configured to conjugally receive therein portions of said first panel to provide an interference connection between said nut and said first panel, and wherein said flanges each including a bearing surface for engaging said first panel, the bearing surfaces of said flanges being respectively disposed outboard of said grooves, an aperture in said pilot portion and extending through said first and second opposed faces of said nut, and a locking element extending transversely across said aperture, and (2) a fastening stud passing through said opening in said second panel and bearing against said panel, said stud extending into and being rotatable within said nut aperture, said stud including means for locking sid stud with said locking element upon partial rotation of said stud in one direction relative to said locking element, said locking means and said locking element cooperating to prevent separation of said first and second panels, and said stud includes a spiral cam track slot therein, said locking element being received within said slot and defining a cam follower;

said first face of said nut defines a bearing surface extending substantially coplanar with one face of said first panel and engaging said second panel and circumscribing said nut aperture, one of said nut faces including a third groove therein intersecting said aperture, and said locking element includes an elongate wire member having the opposite ends thereof mounted within said third groove, said locking element including a pair of looped resilient portions proximate its opposite ends and a straight leg portion which is disposed between said looped portions, said straight leg portion extending across the nut aperture at an angle relative to the axis of said third groove, and said looped portions being yieldable upon engagement of said stud with said straight leg portion to permit axial displacement of said locking element, and wherein said opposite extremities of said locking element is secured within said third groove by the material of said nut adjacent said third groove, said nut material overlapping said extremities within said third groove.

2. The panel-fastener assembly of claim 1, wherein each of said grooves in said flanges is defined by an undercut extending into said pilot portion.

3. The panel-fastener assembly of claim 15, wherein each of said grooves in said flanges is defined by a pair of relatively tapered sidewalls and a bottom wall.

4. The panel-fastener assembly of claim 1, wherein said fastener assembly includes means for biasing said stud and said locking element away from each other along the axis of said nut aperture.

5. The panel-fastener assembly of claim 4, wherein said stud includes a head, an elongate shaft connected to said head, and said biasing means includes a spring sleeved over said shaft and engaging said head.

6. A strip of pierce nuts adapted to be installed in a panel or the like, comprising:

a plurality of nut bodies arranged in side-by-side relationship forming a strip, each of said nut bodies including opposing faces and an aperture therethrough adapted to receive a male fastening member therein;

a frangible interconnection between adjacent nut bodies in said strip; and a plurality of locking elements respectively associated with and secured to one face of said nut bodies, each locking element extending transversely across the corresponding nut aperture and engageable with a male fastening member inserted into the aperture, said locking elements being defined by a continuous, elongate, frangible wire extending between said nut bodies and along said strip, said frangible interconnection and said frangible wire being severable between said nut bodies to allow successive separation of said nuts from said strip during installation of said nuts, each of said nut bodies includes a pilot portion, and said aperture extends through said pilot portion and each of said opposing faces, one of said opposing faces defining a bearing surface adapted for engaging a part to be fastened to the nut body, one of said opposing faces including a first groove therein communicating with said aperture, said frangible wire being mounted within said groove;

means for securing said wire within said first groove, said securing means including a portion of said nut body deformed into overlapping relationship to said wire;

said nut bodies are generally rectangular, the mutually adjacent sides of said nut bodies extending essentially parallel to each other, and said first grooves of said nut bodies are substantially aligned along a common axis;

said wire is defined by a plurality of sections respectively associated with and secured to said nut bodies, each of said sections including a pair of resilient loops disposed within said aperture and a straight leg connecting said loops, each said leg extending across a respective nut aperture at an angle relative to the axis of said first groove and defining said locking element; and each of said nut bodies includes second and third grooves therein respectively on opposite sides of said first groove, and said frangible interconnection is defined by a pair of wires respectively mounted within said second and third grooves.

* * * * *